United States Patent [19]

Lewandowski

[11] Patent Number: 4,541,066

[45] Date of Patent: Sep. 10, 1985

[54] METHOD AND APPARATUS FOR CHECKING THE FUNCTIONS OF A DISPLAY SYSTEM

[75] Inventor: Reiner Lewandowski, Friedberg-Wulfertshausen, Fed. Rep. of Germany

[73] Assignee: Pfister GmbH, Fed. Rep. of Germany

[21] Appl. No.: 320,733

[22] Filed: Nov. 12, 1981

[30] Foreign Application Priority Data

Nov. 20, 1980 [DE] Fed. Rep. of Germany ....... 3043723

[51] Int. Cl.³ .......................... G05B 19/02; G09G 3/00
[52] U.S. Cl. ............................... 364/580; 324/73 AT; 340/715; 364/551; 371/24
[58] Field of Search ........... 324/73 R, 73 AT, 73 PC; 364/550, 551, 579, 580; 371/20, 24, 25; 340/715

[56] References Cited

U.S. PATENT DOCUMENTS

| 3,082,374 | 3/1963 | Buuck | 364/579 X |
| 3,753,226 | 8/1973 | Schnurmann et al. | 371/25 |
| 3,866,171 | 2/1975 | Loshbough | 340/715 X |
| 3,892,955 | 7/1975 | Maejima | 371/20 |
| 4,158,432 | 6/1979 | van Bavel | 371/20 |
| 4,168,527 | 9/1979 | Winkler | 364/580 |
| 4,188,625 | 2/1980 | Hodemaekers | 340/642 |
| 4,242,677 | 12/1980 | Jonath | 340/715 |
| 4,247,852 | 1/1981 | Utzinger | 340/715 |
| 4,453,128 | 6/1984 | Steinmetz | 324/73 AT |

*Primary Examiner*—Felix D. Gruber
*Assistant Examiner*—Edward R. Cosimano
*Attorney, Agent, or Firm*—Hill, Van Santen, Steadman & Simpson

[57] ABSTRACT

A method and apparatus for checking the functions of a display system display data which is received from a processing unit, store the displayed data, and check the stored data for identity with the data which is to be received and displayed. The check determines not only whether the display system has properly received the data, but also checks for malfunctions in the display system itself, such as a short circuit or an open circuit within the display unit, because the stored data can only correspond to the data intended for display when no malfunctions have occurred in either the display system or in the circuit for receiving the data.

15 Claims, 2 Drawing Figures

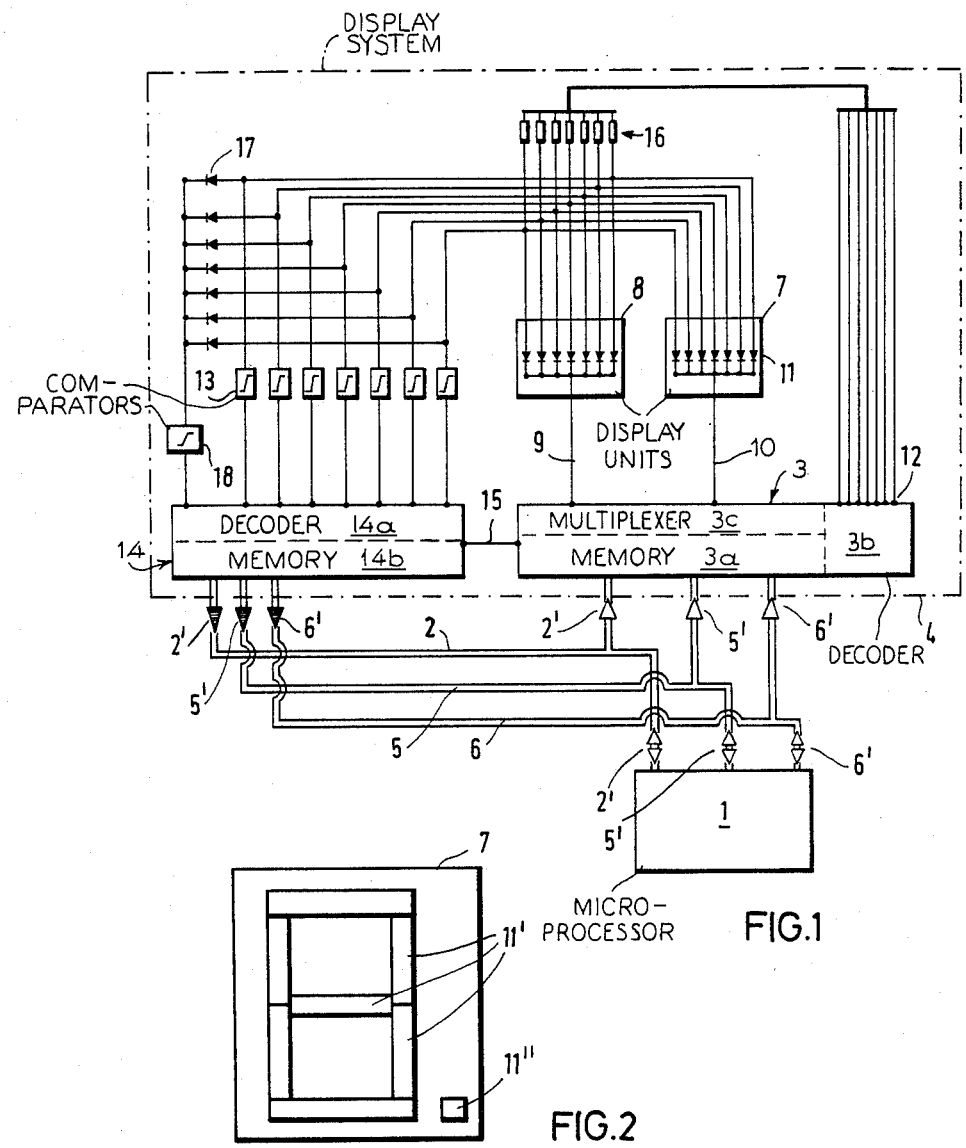

4,541,066

METHOD AND APPARATUS FOR CHECKING THE FUNCTIONS OF A DISPLAY SYSTEM

BACKGROUND OF THE INVENTION

The present invention relates to methods and devices for monitoring the functions of a display system which receives data from any data-producing unit connected thereto.

Display systems of measuring instruments such as, for example, weight scales which are used to weigh commercial vehicles and the loads carried by such vehicles, are subject to compulsory calibration. Such calibration is generally legally standardized, which imposes high demands on the functional reliability of the scale. Failures or changes in the operating characteristics of components in such a display system which has no means for error recognition result in inaccurate displays. The reliability of the particular measuring instrument depends upon the frequency of such faulty displays. Circuits which are generally disposed between a means for determining the measured value and the display system, which circuits not only transmit the measured values but also store those values, are becoming increasingly complex and devices for monitoring the operation of such circuits are becoming correspondingly complex. This is particularly so if a microprocessor is employed as a data compiling and generating unit.

Semiconductor modules are known which accept a complete data record from a microprocessor system and independently drive a display system comprising several decades in multiplex operation. Because the microprocessor and the internal multiplexer of the display system are generally asynchronously operated, it is not possible to check the operation of the display system for errors without auxiliary means.

It is thus an object of the present invention to provide a method and apparatus for monitoring the functions of a display system which is simple in operation and can be economically employed in conjunction with systems utilizing a microprocessor. The above object is inventively achieved in a method and apparatus which display data which is accepted from a microprocessor, which store the displayed data, and which check the stored displayed data for identity with the data which is to be accepted and to be displayed. In this manner, a check can be undertaken not only to determine whether the circuit of the display system accepting the data has properly accepted the data, but also checks for malfunctions in the display system itself, such as the existence of short circuits or open circuits within a display unit. Such malfunctions can be immediately detected because the stored data will correspond to the data intended for display only when no errors occur either in the display system or in the circuit accepting the data, thus insuring the accuracy of the displayed data.

In a further embodiment of the invention, the identity check is undertaken decade by decade. This affords the ability of topically tracing an existing error such as, for example, the failure of a particular component.

BRIEF DESCRIPTION OF THE DRAWINGS

FIG. 1 is a block diagram of an apparatus for checking the functions of a display system employing the method disclosed and claimed herein.

FIG. 2 is a front view of a display unit employed in the apparatus shown in FIG. 1.

DESCRIPTION OF THE PREFERRED EMBODIMENTS

An apparatus for checking the functions of a display system 4 employing a microprocessor 1 is shown in FIG. 1. Information transfer between the microprocessor 1 and the display system 4 takes place via a data bus 2, an address bus 5 and a control bus 6. The arrows 2', 5' and 6' indicate the direction of respective information transfer between the display system 4 and the microprocessor 1. The microprocessor 1 transmits data to a functional unit 3 of the display system. The functional unit 3 contains at least a memory 3a, a decoder 3b and a multiplexer 3c, and may contain other components which are not material to the invention disclosed and claimed herein.

The display system 4 comprises a plurality of decades which are respectively visually displayed by a corresponding plurality of display units. Two such display units 7 and 8 and the respective outputs 10 and 9 from the multiplexer 3c are shown in FIG. 1, however, it will be understood that any number of such display units and corresponding multiplexer connections may be employed. Each display unit, such as the display units 7 and 8, contains seven segments 11 which may, for example, light emitting diodes and which have a common cathode which is connected to the outputs 10 and 9 of the multiplexer 3c.

The spatial disposition of the light emitting surfaces of the segments 11 is shown in FIG. 2, by means of which the numbers 0 through 9 can be formed as is known to those skilled in the art. The segments which are employed to visually display a particular number are referenced at 11', and an additional segment for representing a decimal point is referenced at 11".

A corresponding number of decoder outputs 12 are connected to each of the display units 7 and 8 through individual resistors 16.

Data in the form of binary coded decimals is transmitted via the data bus 2 to the functional unit 3 wherein the data is first decoded into a known "seven segment code" compatible with the display units 7 and 8 and corresponding to the seven segments 11 thereof, and arrives successively by the operation of the multiplexer 3c at the display units 7 and 8 through the decoder outputs 12 for display. Even though the data is successively supplied, it appears as though all of the display elements which may be employed to represent a particular numeral are switched on at the same point in time as a result of the extremely fast switching sequence.

The data pending at the display units 7 and 8 successively arrive in respective decades through a corresponding plurality of comparators 13 whose outputs are connected to a second functional unit 14 in which a recoding from the "seven segment code" back into the binary coded decimal code in undertaken and the recoded data is then stored therein. The functional unit 14 thus contains at least a decoder 14a and a memory 14b, although the functional unit 14 may contain further components not material to the invention disclosed and claimed herein.

Visual display systems utilizing seven segment display units generally employ five bits for coding numerals in the binary coded decimal code, four of such bits being required for representation of the numerals 0 through 9, with the fifth bit containing information as to the position of the decimal point. The fifth bit is supplied from the memory 3a of the functional unit 3 to the memory 14b of the functional unit 14 via a line 15. The memory 14b contains the decades of a value which has been displayed by the display system 4, and the decades are provided with flags. It will be understood, however, that the invention disclosed and claimed herein is not limited to use with the binary coded decimal code and the use of the "seven segment code" as the code which is transmitted to the display units 7 and 8. Other codes known to those skilled in the art may be employed without departing from the inventive concept disclosed herein. The code and display units thus may, for example, exhibit more than seven segments.

Before updating the display system 4 by the microprocessor 1, a flagged decade is read out of the memory 14b and is checked for identity with the corresponding value of the preceding updating value. Simultaneously with a check operation executed on a particular decade, the next successive decade arriving in the memory 14b is flagged, at which decade the check operation is subsequently continued, that is, the flagged value of said following decade is read out and is compared with the corresponding value of the preceding updating, which continues until all decades have been checked.

If a segment 11 of one of the display units 7 or 8 has a short circuit, or if the data intended for display transmitted by the microprocessor 1 have either not been correctly accepted by the functional unit 3 or have been incorrectly transformed by that unit, an error information signal in the form of a "wrong bit" pattern arrives at the memory 14b of the functional unit 14 and is immediately perceived as such. The detection of such error information can be exploited by the microprocessor 1 in numerous ways as are known to those skilled in the art such as, for example, actuation of an optical or acoustical malfunction display means.

If a segment 11 has an open circuit, the voltage will noticeably increase at the anode because, as a result of the interruption, no voltage drop will occur across the respective resistor 16. Such an open circuit is detected via a corresponding plurality of diodes 17 and a correspondingly set comparator 18, which is also connected to the functional unit 14.

The output signal of the functional unit 14 indicating the presence of an error can also be triggered by the comparator 18 or, such an error may be reported directly to the controlling microprocessor 1.

The above-described method and apparatus for checking a data-accepting display system can also be applied to display units having light emitting diodes which are interconnected at the anode side. Other luminescent elements can also be employed in place of light emitting diodes without departing from the inventive concept disclosed herein.

Although further modifications may be suggested by those skilled in the art it is the intention of the inventor to embody within the patent warranted hereon all such changes and modifications as reasonably and properly come within the scope of his contribution to the art.

I claim as my invention:

1. A method for verifying the correct display of data transmitted from a data processor to a display unit comprising the steps of:
   receiving, by the display unit, a data word consisting of a predetermined number of digits coded in a processor code;
   storing the individual digits of the processor code;
   converting the stored individual digits of the data word from the processor code into a display code;
   selectively energizing display elements for each individual digit in accordance with the display code;
   determining the display elements selectively energized in order to recover the individual digits in the display code;
   converting the individual digits from the display code into the processor code; and
   storing the digits in the processor code and retransmitting the digits to the processor for checking the retransmitted digits with the digits transmitted to the display unit.

2. The method of claim 1, wherein the step of selectively energizing the display elements comprises the step of:
   time multiplexing the display elements in respect of the individual digits and continuously repeating the selective energization of the display elements.

3. The method of claim 1, wherein the step of retransmitting the digits to the processor is further defined as:
   retransmitting the digits one digit at a time from the display unit to the processor.

4. The method of claim 3, wherein the step of receiving a data word from the processor is further defined as:
   receiving at least one digit of the data word flagged by the processor; and
   the step of retransmitting includes the step of:
   selecting a flagged digit for retransmission from the display unit to the processor.

5. The method of claim 4, and further comprising the step of:
   successively flagging the digits of the data word transmitted by the processor for retransmission from the display unit to the processor.

6. The method of claim 1, wherein:
   the step of receiving a data word by the display unit is further defined as receiving the data word in a binary decimal code; and
   the step of converting the individual digits of the data word into a display code is further defined as converting the data word into a seven segment code.

7. A display unit to receive and display data transmitted as a data word, including a plurality of digits, from a processor, comprising:
   first conversion means for converting the digits of a data word received from the processor in a processor code into a display code;
   a plurality of display elements;
   first storage means connected to said first conversion means for storing the digits of the received data word in the processor code;
   energizing means connected to said first storage means for selectively energizing display elements for each digit of the data word;
   sensing means connected to said display elements for determining selectively energized elements for each digit;
   second conversion means connected to said sensing means for converting digits from the display code into the processor code; and
   second storage means connected to said second conversion means for storing digits in the processor code and for retransmitting the digits to the processor for checking the identity of a digit retransmitted to the processor with the corresponding digit transmitted to the display unit.

8. The display unit of claim 7, wherein:
   each of said display units comprises a plurality of luminescent segments for representing numerals.

9. The display unit of claim 8, wherein:
said luminescent elements are light emitting diodes.

10. The display unit of claim 7, wherein said sensing means comprises:
a plurality of means, each connected to a respective luminescent segment, for checking for an open circuit associated with the luminescent segment.

11. The display unit of claim 10, wherein:
each of said means for checking for an open circuit comprises a comparator connected between the respective luminescent segment and said second conversion means for comparing the stored display data for identification with respect to the data received from the processor, each of said comparators having a selected threshold level for indicating the presence of a short circuit.

12. The display unit of claim 7, and further comprising:
means connected to said luminescent segments for checking for an open circuit associated with a luminescent segment.

13. The display unit of claim 12, wherein:
said means for checking for an open circuit comprises a comparator commonly connected to all of said luminescent segments and connected to said means for comparing the stored display data for identifying with the data received from said processor.

14. The display unit of claim 13, wherein:
said plurality of display elements is divided into decades;
said energizing means is operable to energize said display elements decade by decade; and
said means for comparing the stored displayed data for identity with the data received from the processor includes means for comparing the stored display data decade by decade.

15. The display unit of claim 7, wherein the data is received from the processor in the form of binary coded decimals and said plurality of display elements for displaying data received from the processor each comprise a seven segment data display, and wherein:
said first conversion means comprises means for converting binary coded decimal codes into seven segment codes; and
said second conversion means includes means for converting seven segment codes into binary coded decimal codes.

* * * * *